United States Patent [19]

Rietsch

[11] 4,390,973
[45] Jun. 28, 1983

[54] METHOD FOR DETERMINING THE EXTENT OF SUBSURFACE REACTION INVOLVING ACOUSTIC SIGNALS

[75] Inventor: Eike Rietsch, Houston, Tex.

[73] Assignee: Deutsche Texaco Aktiengesellschaft, Fed. Rep. of Germany

[21] Appl. No.: 253,994

[22] Filed: Apr. 13, 1981

Related U.S. Application Data

[63] Continuation-in-part of Ser. No. 21,512, Mar. 19, 1979, abandoned.

[30] Foreign Application Priority Data

Mar. 22, 1978 [DE] Fed. Rep. of Germany ....... 2812490

[51] Int. Cl.³ .............................................. G01V 1/30
[52] U.S. Cl. ........................................ 367/40; 367/39; 367/56; 364/421
[58] Field of Search ................. 367/14, 39, 40, 37, 367/56, 57, 27; 364/421

[56] References Cited

U.S. PATENT DOCUMENTS

| | | | |
|---|---|---|---|
| 2,803,305 | 8/1957 | Behning | 367/40 |
| 3,302,166 | 1/1967 | Zemanek, Jr. | 367/27 |
| 3,417,370 | 12/1968 | Brey | 367/40 |
| 3,586,105 | 6/1971 | Johnson | 166/250 |
| 3,739,871 | 6/1973 | Bailey | 367/37 |
| 3,805,587 | 4/1974 | Sayer | 367/37 |
| 3,812,457 | 5/1974 | Weller | 367/36 |
| 3,921,126 | 11/1975 | Waters | 166/250 |
| 4,009,609 | 3/1977 | Sayer et al. | 367/44 |
| 4,069,471 | 1/1978 | Silverman | 367/40 |
| 4,214,226 | 7/1980 | Narasimhan et al. | 367/57 |

*Primary Examiner*—Nelson Moskowitz
*Attorney, Agent, or Firm*—Carl G. Ries; Robert A. Kulason; Ronald G. Gillespie

[57] ABSTRACT

A method determines the extent of subsurface reactions in which random acoustic signals are radiated from a whole area covered by the reaction or from a boundary region, hereafter termed reaction front, between largely undisturbed rocks and those already covered by the reaction. The signals are recorded by at least two receivers positioned at different locations outside the reaction area. The recorded signals are cross-correlated as a function of a time shift between the recorded signals so that at least one surface confining the reaction area is determined from the cross-correlation.

8 Claims, 11 Drawing Figures

CROSSCORRELATION OF SIGNALS $S_A$ & $S_B$

ENVELOPE OF SIGNALS $S_A$ & $S_B$ CROSSCORRELATION

CROSSCORRELATION OF SIGNALS $S_A$ & $S_B$

ENVELOPE OF SIGNALS $S_A$ & $S_B$ CROSSCORRELATED

METHOD FOR DETERMINING THE EXTENT OF SUBSURFACE REACTION INVOLVING ACOUSTIC SIGNALS

CROSS REFERENCE TO RELATED APPLICATIONS

This application is a C-I-P as to all subject matter common to U.S. application Ser. No. 021,512 filed Mar. 19, 1979 by Eike Rietsch and assigned to Deutsche Texaco Aktiengesellschaft, assignee of the present invention, and now abandoned, and a continuation-in-part for additional subject matter.

BACKGROUND OF THE INVENTION

1. Field of the Invention

The present invention relates to seismic methods in general and, more particularly, to involving random acoustic signals.

2. Summary of the Invention

A method determines the extent of subsurface reactions in which random acoustic signals are radiated from a whole area covered by the reaction or from a boundary region, hereafter termed reaction front, between largely undisturbed rocks and those already covered by the reaction. The signals are recorded by at least two receivers positioned at different locations outside the reaction area. The recorded signals are cross-correlated as a function of a time shift between the recorded signals so that at least one surface confining the reaction area is determined from the cross-correlation.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

The invention concerns a method for monitoring subsurface processes. In view of an expected shortage of sources of primary energy and of raw materials, reservoirs of such raw materials have gained interest where in the past they have not been considered for economical and technical reasons. Attempts are now being made to exploit these reservoirs by means of new technology. One such new technology is the in-situ coal gasification of coal deposits. In this method, a feed gas is injected into a coal seam from an injection well. The process gas produced by the reaction of coal and feed gas (incomplete combustion) is recovered by production wells which are generally located on a circle around the injection well. The reaction front which separates that portion of the coal seam which has already been subject to the reaction and is referred to as the reaction area from that portion of the coal seam which has not experienced reaction. Normally, the reaction front progresses from the injection well further and further away from the injection well.

In addition to knowledge of reaction parameters, such as pressure and temperature, the determination of the location of the reaction front is also important for the control of the subsurface reaction taking place in the coal seam.

A similar task exists with the in-situ combustion for enhanced oil recovery from oil reservoirs or with sulfur mining by means of the Frash process, in which a partial combustion is initiated at one point within the deposit and sustained by the injection of an oxygen-containing gas. With all these methods, there exists the need to determine the position of the reaction front and thereby the size of the area around the injection well covered by the reaction.

Figure 1A:
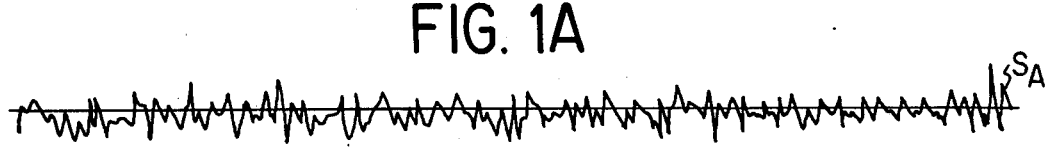
FIGS. 1A and 1B show graphic examples of portions of signals occurring during practice of the method in accordance with the present invention.
Figure 1B:
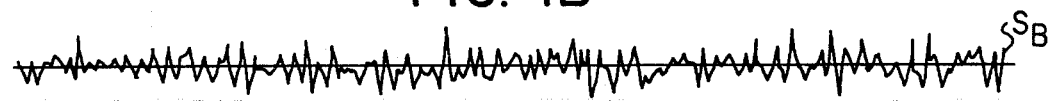
Figure 1C:
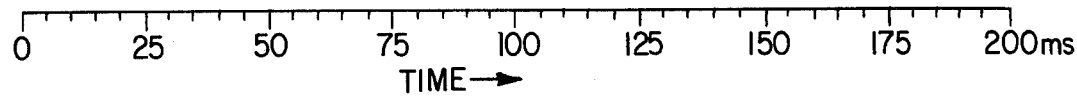
FIG. 1C shows a time scale for FIGS. 1A and 1B.

The signals radiated by the subsurface processes considered here do not generally possess large amplitudes. Here, rather, signals from many individual little cracks which continually occur within the whole reaction area and particularly within the reaction front overlap, and the incident of a crack formation is not known for any one of the cracks. Therefore, on inspection, traces of such signals, portions of which are shown in FIGS. 1A and 1B along a time reference shown in FIG. 1C, appear to be completely uncorrelated. However, the two signals are correlated.

Figure 2:
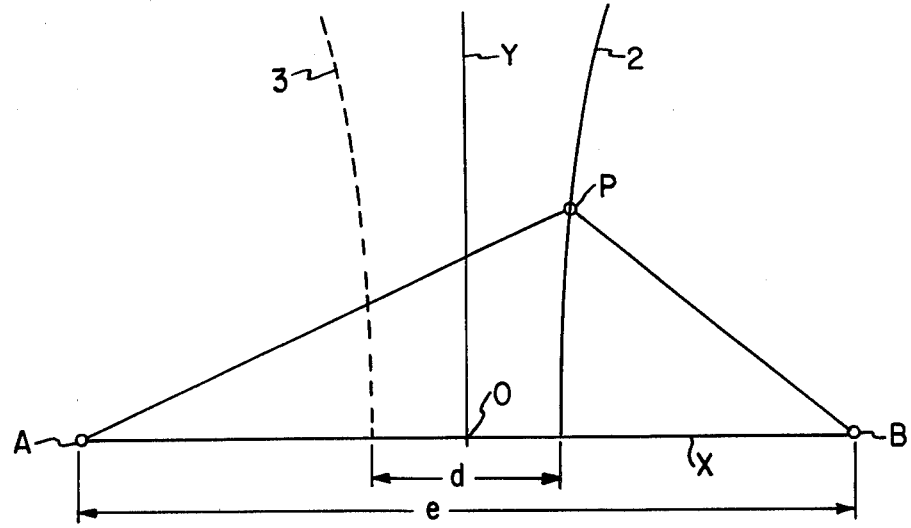
FIG. 2 shows the relationship of a two-sheet hyperboloid having focal points A and B.

To understand the basic principle, a two sheet, sheets 2 and 3, hyperboloid of revolution has focal points, denoted by A and B, respectively, as shown in FIG. 2. The hyperboloid is created by the rotation of a hyperbola, having focal points A and B, around an x axis which passes through the focal points A and B. With respect to the x axis and a perpendicular y axis, the hyperbola is described by the following equation:

$$(e^2-d^2)x^2 - d^2y^2 = d^2(e^2-d^2)/4 \qquad (1)$$

where d is the distance between the vertices of the sheets 2 and 3 of the hyperbola noted as vertex distance and e is the distance between focal points A and B. The origin O of the coordinate system lies in the middle between focal points A and B.

It is well known that a hyperbola is the locus of all points whose distance from both focal points has a constant difference, d (see *Handbook of Mathematical Tables and Formulas*, R. S. Burington, published by Handbook Publishers, Inc., Sandusky, Ohio, 1947). Further, the distance between focal point A and an arbitrary point P on the sheet 2 of the hyperboloid of revolution is longer by the constant difference d than the distance between the arbitrary point P on sheet 2 and focal point B.

For this reason, the signal orginating from point P on sheet 2 of the hyperboloid reaching focal points A and B has a time difference $\tau = d/v$ where v is the velocity of the signal. A signal originating from an arbitrary point on sheet 3 reaches focal point B by the same time difference $\tau$ later than the signal reaches focal point A. By shifting a trace $s_A(t)$ recorded at focal point A with respect to the trace $s_B(t)$ recorded at focal point B by the time $\tau$, signals originating from all points of sheet 2 appear simultaneously on both traces $s_A(t+\tau)$ and $s_B(t)$.

The sum of the product of the traces belonging to the same time, t, extended over a specific time range T is approximately proportional to the total energy of the signals originating from all points of sheet 1 of the hyperbola during the time T. The mathematical expression for the product summation has the form $$C_{AB}(\tau) = \int_0^T s_A(t+\tau)s_B(t)dt \text{ and} \quad (2)$$

$$C_{AB}(\tau) = \sum_i s_A(t_i+\tau)s_B(t_i) \quad (3)$$

where equation 2 is utilized for continuous signal and equation 3 is utilized for discrete signals. It is essential that the time T is long enough to ensure that the influence of noise and signals originating from other parts of the reaction area on the sum of the product can be neglected.

Signals which do not originate from points on the sheet of the hyperboloid appear on both traces at different times and cancel to a great extent during the formation of the sum of the products. Strictly speaking, this only applies when the autocorrelation function of the signals produced during the cracking of the formation has the form of an impulse. The influence on the sum of products of an autocorrelation function with finite width will be described hereinafter.

The shift of one trace with respect to the other and the determination of the sum of products as explained previously is no more than the computation of the cross correlation function of both traces for a particular shift $\tau$. It is preferred to determine the cross correlation function $C_{AB}(\tau)$ of traces A and B, for a range of shifts which covers at least the interval $[-\tau_A, \tau_B]$. The value $\tau_A$ is at least the greatest difference of time by which a signal originating from the reaction area reaches focal point A earlier than it reaches focal point B. Similarly, $\tau_B$ denotes the greatest difference in time by which a signal originating from the reaction area reaches focal point B earlier than it reaches focal point A.

Figure 3:
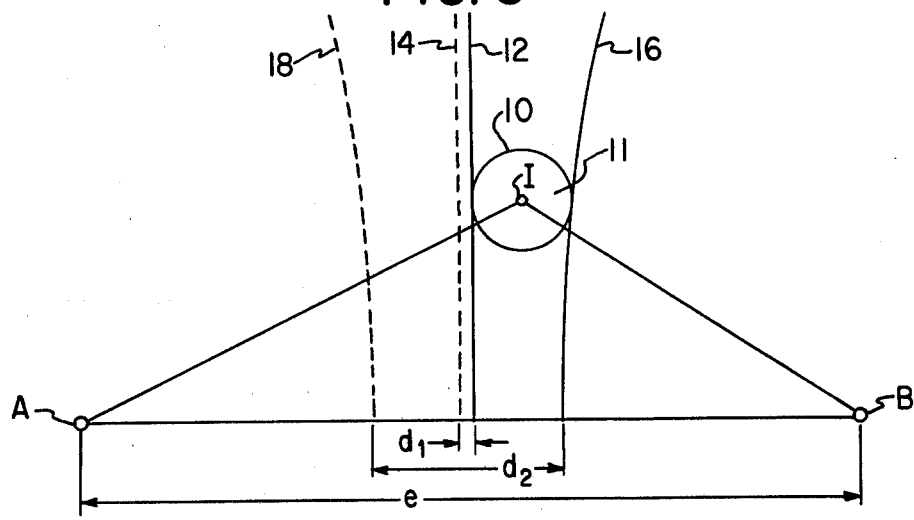
FIG. 3 geometrically relates an injection well I and observation wells A and B on which the represented signals in FIGS. 1A and 1B are based.

Referring now to FIG. 3, by way of example, an injection well I has been utilized for in-situ combustion which results in a reaction front 10 expanding outward from well I having a reaction area 11. At least two observation wells A and B separated by a distance e include receivers also designated as A and B, respectively, monitoring sounds emanating from the reaction front. The designation of A and B for the observation well and receivers and e for the distance between A and B has been selected so that the wells and receivers A and B and distance e can be related to the preceding theoretical discussion if so desired. These sounds originate, for example, from the formation of microcracks and small fissures as a consequence of the elastic stretches coupled with strong temperature gradients, or, as a result of recrystallization of minerals due to the increased temperatures. Receivers A and B provide electrical signals $s_A$ and $s_B$ in response to the sounds or acoustical signals, having the wave forms shown in FIGS. 1A and 1B, respectively, over a time period shown in FIG. 1C. The signals may then be recorded by conventional means and hereinafter are referred to as traces, or they may be digitized to provide series of digital values. Signals $s_A$ and $s_B$ contain components resulting from the acoustic signals coming from the various locations within the reaction area and especially from the reaction front itself and components of noise. Such noise is caused by other processes not caused by the ongoing reaction and not confined to the reaction area, such as the flow of feed and process gas.

The recording of signals as occurred during the formation and propagation of a subsurface crack, has already been described by Bailey in the U.S. Pat. No. 3,739,871. Contrary to the present application, this patent concerns a method in which acoustic signals from a hydraulically induced crack are recorded by a plurality of receivers. The incident of the crack formation is known, as it is accompanied by a sudden loss of pressure in a hydraulic liquid and the extent of the crack is determined from the travel time to the receivers of the signals radiating during the cracking of the formation. A prerequisite for this method is that only one large crack occurs and that the signals radiated during the cracking of the formation are so strong that they arrive at the receivers with an amplitude significantly above the noise level.

Referring again to FIG. 3, lines 12,14 represent sheets of one hyperboloid having focal points at wells A and B, while lines 16,18 represent sheets of another hyperboloid having the same focal points as wells A and B. As can be seen, the distance d heretofore mentioned is shown as $d_1$ for the hyperboloid having sheets 12,14 and as $d_2$ for the hyperboloid having sheets 16,18. When reaction front 10 is at a distance R away from the injection well I, $R_A$ and $R_B$ being the distances of well I from wells A and B, respectively, and injection well I is on the axis between wells A and B, then $$\tau_A = (R_B - R_A + 2R)/v \quad (4)$$

$$\tau_B = (R_A - R_B + 2R)/v \quad (5)$$

Although in the strictest sense equations 4 and 5 are only valid for injection well I lying on the axis, they still may be used to determine $\tau_A$ and $\tau_B$ when the injection well I is not on the axis since the values for $\tau_A$ and $\tau_B$ need not be determined exactly as they represent maximum time limits.

It is preferred that a range of shifts $\tau$ be selected for which the cross-correlation function is to be calculated which is greater than the interval $[-\tau_A, \tau_B]$.

Figure 4A:
FIGS. 4A and 4B are the cross-correlation of portions of signals $s_A$ and $s_B$, shown in FIGS. 1A and 1B, respectively, and the envelope of the cross-correlation, respectively.
Figure 4B:
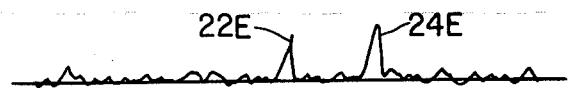
Figure 4C:
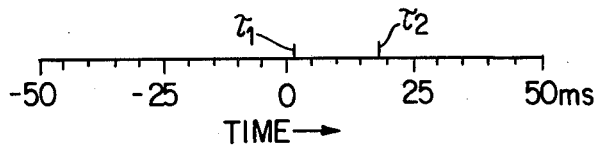
FIG. 4C is a time references for FIGS. 4A and 4B.

The cross-correlation function is now evaluated in such a manner that a correlation onset time $\tau_1$ is determined. The resultant trace from the cross-correlation of signals $s_A$ and $s_B$ is shown in FIG. 4A; the envelope of that trace is shown in FIG. 4B in a time frame represented by FIG. 4C. The correlation onset time $\tau_1$ occurs when its values exceed the general noise level due to signals coming from the reaction front as shown in FIG. 4C. The correlation end time $\tau_2$ may also be determined and occurs when those values of the cross-correlation function finally return to the noise level which is also shown in FIG. 4C. Thus, the time interval defined by $\tau_1$ through $\tau_2$ is that time interval when acoustic signals have been received from the reaction.

If $\tau_1$ is negative, the increased values of the cross-correlation functions are caused by the correlation of signals originating from sheet 14 of a hyperbola which grazes the reaction area and whose vertex distance $d_1$ is given by $$d_1 = v|\tau_1| \tag{6}$$

In this situation, the reaction area lies outside the sheet of the hyperbola. If $\tau_1$ is positive, then the increased values are the result of the correlation of signals coming from sheet 12 of the same hyperboloid and the reaction area lies inside sheet 12 of this hyperboloid.

When $\tau_2$ is negative then the increased values of the cross-correlation function are caused by the correlation of signals originating from a sheet of a hyperboloid nearer to focal point A which grazes reaction area 11 and whose vertex distance $d_2$ is given by $$d_2 = v|\tau_2| \tag{7}$$

In this situation, reaction area 11 is within this sheet of the hyperboloid. When $\tau_2$ is positive then the increased values are the result of the correlations of signals coming from the other sheet of the same hyperboloid and the reaction area is inside of the other sheet of the hyperboloid. Thus from the knowledge of $d_1$, $d_2$, e and so forth, reaction area 11 bounded by reaction front 10 can be defined.

However, a better definition of reaction area 11 obviously can be obtained by using additional observation wells with additional receivers. For example, if observation wells C and D were also used the process of the present invention would be applicable with cross-correlation of pairs of signals such as $s_A$ and $s_B$, $s_A$ and $s_C$, $s_A$ and $s_D$, $s_B$ and $s_C$, $s_B$ and $s_D$ and $s_C$ and $s_D$. Each of these cross-correlation functions leads to two hyperboloid sheets which bound reaction area 11. Thus, when there are J observation wells, it is possible to bound reaction area 11 by $J(J-1)$ hyperboloid sheets through an evaluation of the cross-correlation function of all possible $J(J-1)/2$ combinations of pairs of traces. As in the previous case with wells A, B, C and D, there are six combinations of wells A, B, C and D. Letting $J=4$, we arrive at the same conclusion, namely there are six different cross-correlations.

Bounding of reaction area 11 in the foregoing example becomes particularly simple if the problem is essentially two dimensional. It can be assumed, for example, that the reaction area is essentially cylindrically shaped with the axis of the cylinder vertical to a plane which passes through the two receivers and, for example, through the center of the area in the injection well where the feed gas is injected into the formation, then the reaction area is confined by hyperbolical cylinders, whose trace lines are the branches of the hyperbola resulting from the section of this plane with the sheets of the hyperboloid.

In the foregoing description of the method, it was assumed so far that the autocorrelation function of the signals originating from the reaction area has a form of a spike. In reality, this is not so. Actual radiated signals have a definite spectrum which is additionally deformed on the way to the receivers by the filter action of the receivers and recording units. The autocorrelation function therefore has a main lobe of finite width and generally secondary lobes which cannot be neglected. The cross-correlation function resulting from these signals are equal to the corresponding cross-correlation functions of spikes convolved with the average autocorrelation function of the actual signals. The secondary lobes of the autocorrelation function therefore lead to forerunners which occur before correlation onset $\tau_1$ and tails which occur after correlation end $\tau_2$.

In order to have the actual correlation function approximate a spike as good as possible, it is preferred to record the widest possible band of frequency. Generally frequencies of up to 1000 hz, as already recorded in seismic surface measurements, will be sufficient. However, in principle there is no reason not to use even higher frequencies and suppress by filtering certain frequency ranges, in which strong unwanted signals occur (e.g., pump noise). In some cases the determination of correlation onset $\tau_a$ and correlation end $\tau_2$ is simpler when the instantaneous envelope rather than the correlation function itself is looked at. The instantaneous envelope is equal to the square root of the sum of squares of the cross-correlation function and its Hilbert transform (e.g., J. G. Thomas, *An Introduction to Statistical Communication Theory*, John Wiley & Son, Inc., New York, 1969, pages 652 ff).

For the determination of the vertex distance of the hyperboloid from correlation onset $\tau_1$ and to correlation end $\tau_2$, respectively, the propagation velocity must be known. This is readily done prior to use of the present invention by measuring the propagation times of acoustical signals from the injection well I to receivers A and/or B. Another method of determining v can be utilized by recording the signals which occur more or less randomly during operations (e.g., perforation) in the injection well within the range of the formation where the reaction is to take place. Cross-correlation of any two traces produces a maximum for a shift $\tau$ which is equal to the difference in distance of the corresponding observation wells to the injection wells divided by the propagation velocity v, thus $$v = (R_A - R_B)/\tau \tag{8}$$

Figure 5A:
FIGS. 5A and 5B are the cross-correlation of other portions of signals $s_A$ and $s_B$ and of the envelope of the cross-correlation, respectively.
Figure 5B:
Figure 5C:
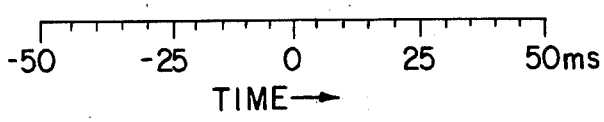
FIG. 5C is a time reference for FIGS. 5A and 5B.

Referring again to FIGS. 1A, 1B and 1C, and by way of example, the two 200 ms long portions of hypothetical signals $s_A$ and $s_B$ received by hypothetical receivers A and B are shown. The two signals $s_A$ and $s_B$ were theoretically developed for being 25 seconds long with a sampling interval of 0.5 ms as recorded by receivers A and B at a distance of $R_A = 100$ m, $R_B = 80$ m, respectively, from an injection well I at a distance of $e = 156$ m. The calculations of signals $s_A$ and $s_B$ were based on the assumption that random signals were radiated from cylindrical reaction front at a distance $R = 10$ m around the injection well I. The amplitude of the signals and the origin of the reaction front was determined by random number generators. The signals emanating from the reaction front have noise superimposed thereon whose power (average squared amplitude per data value) is as great as that of the signals. The cross-correlation function of the two 25 second long traces correlated for shifts $\tau$ extending from $-50$ to 50 milliseconds is shown in FIG. 4A; its envelope is shown in FIG. 4B. The largest amplitudes 22 and 24 of the cross-correlation function are a result of the correlation signals originating from two points on the two hyperboloid sheets grazing the reaction front. The cross-correlation function shown in FIG. 5A was calculated from traces which were less than half as long (10 seconds) than those used for the correlation function shown in FIG. 4A. The noticeable noise level on the cross-correlation envelope shown in FIG. 5B is, as expected, about 50% higher than that shown on the cross correlation envelope of FIG. 4B.

Referring again to FIG. 3, the lines of intersection of the two confocal two sheet hyperboloids of revolution with vertex distances of $d_1 = v|\tau_1|$ and $d_2 = v|\tau_2|$ are confocal hyperbolas with the same vertex distances and focal points. As $\tau_1$ is positive, the boundary of reaction area 11 shown as 10 is within the branch, closer to the receiver B and designated by the numeral 12, of the hyperbola with the vertex distance of $d_1$. The branch designated by the numeral 14 and closer to receiver A of this hyperbola is here of no importance. Since $\tau_2$ is positive the line of intersection, 10, is outside the branch, closer to receiver B and denoted by the numeral 16, of the hyperbola with the vertex distance of $d_2$. The branch closer to receiver A and designated by the numeral 18, of this hyperbola is here also of no importance.

For the improvement of the signal/noise ratio and particularly for the discrimination against wave propagating within the well, it can be advantageous to position in at least some of the observation wells several receivers at specific distances from each other which, electrically connected, supply a summation signal. The mode of operation of such receiver groups is described in detail in the literature (see for instance, Th. Krey, F. Toth; *Remarks on Wave Number Filtering in the Field*, Geophysics, 38 pages 959–970, 1973). Since, in many cases, the propagation velocity of acoustic signals in the formation where the reaction is to take place (e.g. coal seams) is lower than in overburden and basis, the formation behaves as a wave guide. It is then reasonable to distribute the receivers in the observation wells only over a range which lies within the formation in which the reaction takes place.

The foregoing method is readily applicable to a conventional type digital computer operating in conjunction with a plotter.

In summary, acoustical signals from a reaction front are received to provide electrical signals $s_A$ and $s_B$ which are then recorded digitally. The computer is operated to time shift the signal traces by a time $\tau$ and then the time shifted trace as well as the non-time shifted trace is then processed to obtain the cross-correlation in accordance with equation 3. It is done for a range of shifts $\tau$, which is greater than the interval defined by $-\tau_A$, $\tau_B$. The cross-correlation trace is then evaluated by the computer to determine a correlation onset time $\tau_1$ and a correlation end time $\tau_2$. The computer then determines distance $d_1$ from equation 6 and distance $d_2$ from equation 7. It should be noted that the velocity v is already predetermined. The values for $d_1$ and $d_2$ are substituted into equation 1 using the known distance e and the computer steps through different values of x and y. The computer also has within it the standard equation for a circle in terms of x and y and the values for equation 1 and the values of x and y for the standard circle equation coincide with the determination of the radius of the reaction area. It should be noted that it was herebefore described that many observation wells can be utilized. It such a situation, the plots of the sheets of the various hyperboloids would define the reaction area to such an extent that it would not be necessary to use the standard circle equation.

The method of the present invention, as hereinbefore described, monitors an in-situ reaction initiated by the injection of oxygen rich gas in an injection well I. Receivers are placed in at least two observation wells, preferably more, and seismic recordings of sounds partially resulting from the reaction are made on a continuous basis to provide seismic traces. The resultant seismic traces are digitized and processed by cross-correlations. The extent of the reaction area is determined from processing of the cross-correlations in accordance with the present invention.

What is claimed is:

1. A method for determining the extent of subsurface reactions in an earth formation in which random acoustic signals are radiated from that portion of the earth formation involved in the reaction comprising the steps of recording the acoustic signals by at least two receivers, and cross-correlating the recorded signals in accordance with one of the following equations:

$$C_{AB}(\tau) = \int s_A(t + \tau)s_B(t)dt, \text{ or } C_{AB}(\tau) = \sum_i s_A(t_i + \tau)s_B(t_i)$$

where $C_{AB}$ is a cross-correlation function of a time shift $\tau$, $s_A$ corresponds to the signal received by one receiver, $s_B$ corresponds to the signal received by the other receiver, and t is time so that at least one surface containing the reaction area is determined from the cross-correlation; and wherein two values of the time shift ($\tau_1$, $\tau_2$) are determined from the cross-correlation for which the values of the cross-correlation beginning with small shifts increases and, for the first time, exceeds the general noise level and, respectively, where the increased values of the cross-correlation finally return to the general noise level, and that from the absolute values of these time shifts ($\tau_1$, $\tau_2$) two vertex distances ($d_1$, $d_2$) are determined by multiplication of these shifts by the propagation velocity of acoustic signals, and that from these vertex distances ($d_1$, $d_2$) and the locations of the two receivers at focal points, two sheet hyperboloids of revolution are formed and the position of the reaction area is localized in such a way that, depending on the sign of the time shifts ($\tau_1$, $\tau_2$) the reaction area appears either inside or outside of one of the sheets of the hyperboloids of revolution.

2. A method according to claim 1 wherein the signals coming from the reaction area are recorded by J receivers positioned on different locations outside the reaction area whereby $J > 2$ holds, and that the cross-correlation function is determined and evaluated for all possible $J(J-1)/2$ different pairs of traces.

3. A method according to claim 2 wherein the receivers are positioned in the same formation in which the reaction takes place.

4. A method according to claim 3 wherein the signals being radiated from the reaction area are, in at least one location, recorded by a group of receivers rather than by just one receiver which, electrically connected, supply a summation signal so that the individual receivers are positioned at specific intervals in an observation well.

5. A method according to claim 4 wherein the cross-correlations are automatically displayed in analog form via a display unit at periodic intervals during recording of the traces.

6. A method according to claim 4 wherein, on manual control, the cross-correlations are displayed in analog form via a display unit during and after recording of the traces.

7. A method according to claim 4 wherein at least two cross-correlations of signals recorded by the pair of receivers within a period of time which is short compared with the quotient of shortest wave length of the recording signals and the propagation velocity of the reaction front are added.

8. A method according to claim 5, 6 or 7 wherein the envelope from at least one cross-correlation is determined as the square root of the sum of the square of the cross-correlation and the square of its Hilbert transform and that time shifts ($\tau_1$, $\tau_2$) are determined from this envelope rather than from the cross-correlation itself.

* * * * *